INVENTOR.
Robert M. Sondej.
BY
Harness, Talbutt & Baldwin
ATTORNEYS.

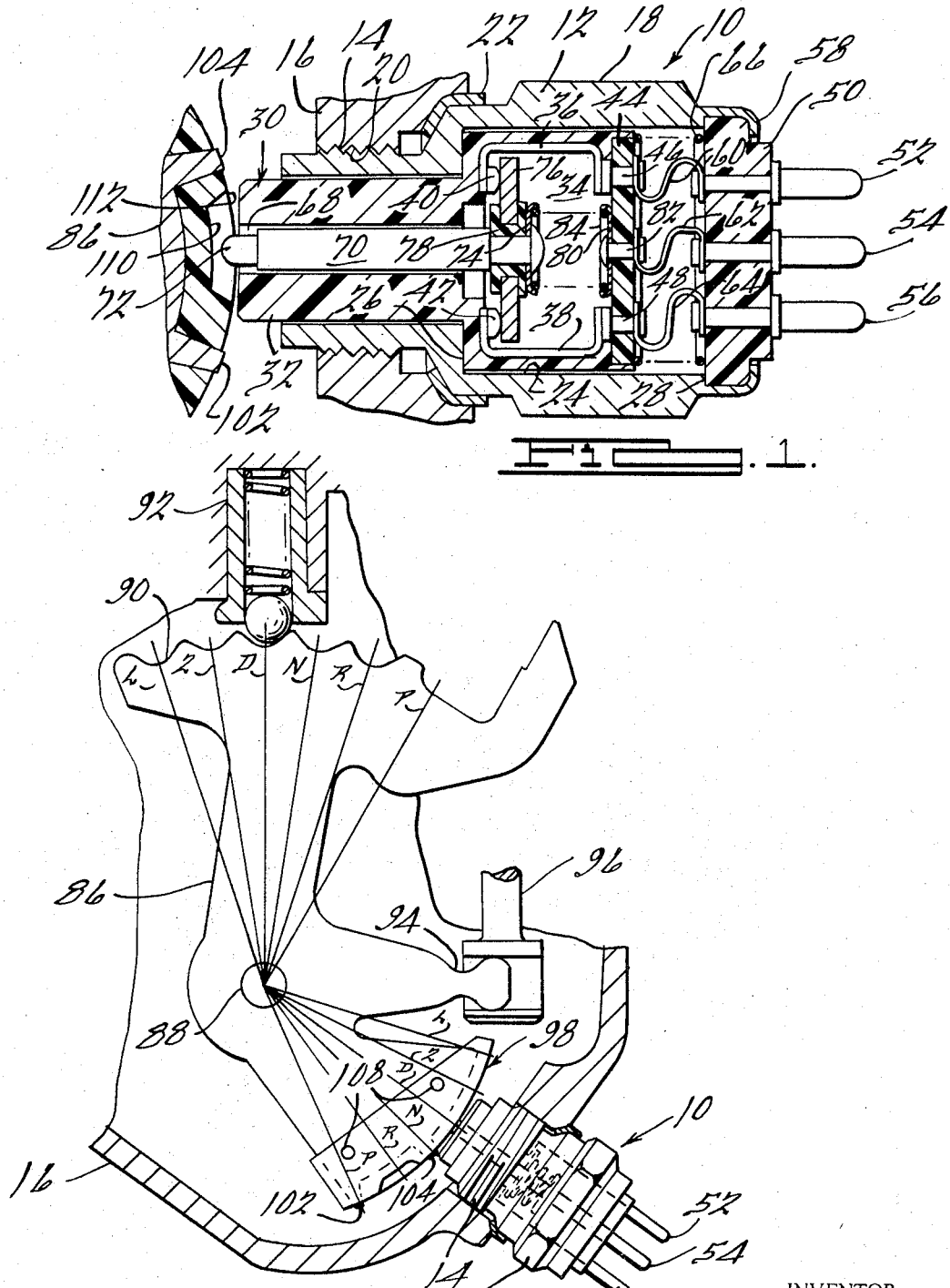

United States Patent Office 3,423,549
Patented Jan. 21, 1969

3,423,549
VEHICLE SAFETY CONTROL APPARATUS HAVING A SELF-ADJUSTING SWITCH
Robert M. Sondej, Warren, Mich., assignor to Chrysler Corporation, Highland Park, Mich., a corporation of Delaware
Filed Sept. 8, 1966, Ser. No. 577,909
U.S. Cl. 200—61.88  10 Claims
Int. Cl. H01h 9/06

This invention relates to safety devices and in particular to a vehicle engine starting and warning light circuit control arrangement. More specifically, it pertains to an electric switch and switch actuating mechanism for controlling a vehicle's backup lights and engine starting motor circuits.

In vehicles equipped with automatic transmissions, it was immediately recognized that safe operation required a safety switch to be provided which would allow the vehicle engine to be started only when the transmission is in neutral or park operating ranges. Obviously, it is most important that such a switch be highly reliable in its operation. More recently, it has become generally recognized that backup lights also make a significant contribution to the safe operation of a vehicle. However, for a long time backup lights were considered as more of a convenience item and, hence, the backup light actuating switch was generally not designed to the high standards required of the engine starting safety switch. For example, vehicles equipped with backup lights have most often been provided with a separate switch that was activated so as to energize the backup lights when the transmission was placed in reverse. Generally such switches were operated through contact with the shift lever of the vehicle. Experience revealed, however, that this was an unsatisfactory arrangement since upon normal service wear the shift lever often failed to operatively engage the switch. Such a failure was not only annoying to the vehicle owner but it presented a potentially dangerous situation since the vehicle was deprived of an effective safety device. In order to overcome this situation, backup light switches were developed which were located within the steering column so as to be placed in more positive engagement with the transmission control mechanism. However, more recent developments in the area of collapsible steering columns make it desirable to leave the steering column as free and uncluttered as possible. Accordingly, attempts have been made to combine the backup light switch and engine starting safety switch so as to thereby minimize space requirements. Unfortunately, such attempts have resulted in switch devices that are too complex, and hence costly, or which do not possess the needed degree of reliability. Accordingly, it is an object of this invention to provide apparatus which is effective in controlling vehicle backup lights and engine starting motor circuits.

A further object is to provide a switch mechanism which is self-adjusting so as to automatically compensate for service wear and tolerance variations or build-up occurring in the mechanism used in conjunction with the switch.

An additional object is to provide a novel actuating mechanism adapted to control the hydraulic control system of a vehicle transmission as well as a combination vehicle engine starting and backup light switch.

A still further object is to provide an actuating mechanism having a novel switch actuating cam arrangement.

Yet another object is to provide a switch and switch actuating mechanism which is compact, of a minimum number of component parts and which is of durable but inexpensive construction.

According to the present invention, a control arrangement is provided which consists of a switch for controlling the operation of the engine starting motor and the vehicle backup light circuits, and a switch actuating mechanism which is responsive to movement of the transmission selector control. If desired, the switch actuating portion of the control arrangement can also be used to actuate the transmission hydraulic control ssytem.

Generally speaking, the actuating portion of the arrangement of this invention comprises a plate member operatively interconnected with the transmission selector so that it undergoes pivotal movement when the selector is moved to various positions such as park, neutral, reverse and drive. This plate is provided with a cam surface made up of electrically conductive and non-conductive areas and a portion of the cam surface is offset with respect to the remainder of the surface. The switch portion of the control arrangement is provided with two plunger like members concentrically disposed one within the other and arranged so as to be capable of independent movement. These plunger members both ride on the surface of the above described cam surface and both plungers carry cooperating contacts.

The electrically conductive areas of the cam surface are interposed in the engine starting and backup light circuits and one of the plunger members is fabricated from electrically conductive material. Accordingly, the switch and switch actuator are arranged so that when the transmission selector is moved into either park or neutral positions, the cam is pivoted to a position where one of its electrically conductive surface areas is brought into contact with the conductive plunger member of the switch. This completes the circuit to the starting motor and enables cranking of the engine. If the transmission selection is moved to the reverse position, the cam is rotated until its offset portion is brought into contact with the plungers thereby moving one of the plungers with respect to the other. This relative movement as between the plungers causes the cooperating plunger contacts to close thereby completing the backup light circuit.

The above and other objects, features and advantages of this invention will be apparent from the following detailed description of a preferred embodiment of the invention and from the accompanying drawings wherein:

FIGURE 1 is a cross sectional view on an enlarged scale of the combination engine starting and backup light switch of this invention, and a fragmentary portion of the switch actuating member;

FIGURE 2 is a view, partially in cross section, of the control apparatus of this invention adapted for operation in cooperation with a vehicle transmission control system;

Figure 3:
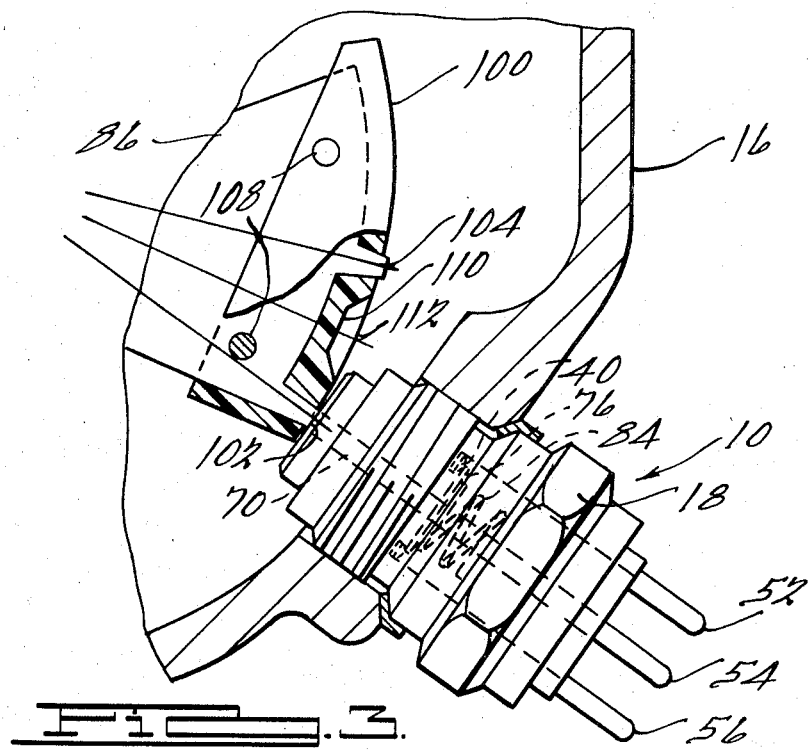
FIGURE 3 is an enlarged fragmentary view of a portion of FIGURE 2 with certain of the elements being illustrated in a different operating condition.

The switch portion of the control mechanism of this invention, indicated generally by reference numeral 10, is shown in FIGURE 1 and comprises an elongated body member 12 mounted in a threaded opening 14 of a transmission casing 16. Body member 12 includes a hexagonal head portion 18 and an externally threaded shank 20 which can be threadedly engaged with opening 14 so as to secure switch 10 to transmission casing 16. A lock washer 22 is carried on the shank portion of body member 12.

Body member 12 is provided with a bore or cylinder 24 extending longitudinally therein. Bore 24 is of a stepped diameter with its diameter at one end portion being smaller than its central region thereby forming shoulder 26. Similarly, shoulder 28 results from the other end portion of the bore being of larger diameter than its center portion.

Reciprocably carried in bore 24 is a cylindrically shaped plunger 30 having a stem portion 32 at one end and a chamber or cavity portion 34 at its opposite end. Two conductor bars 36 and 38 are carried on the interior wall of chamber 34 so as to extend longitudinally with respect to bore 24, and one end of each of the bars provides a radially inwardly extending contact 40 and 42. The other end of the conductor bars 36 and 38 are secured to a transversely extending peripheral wall or cap 44 of plunger 30 by means of suitable fastening means such as rivets 46, 48. Wall 44 and plunger 30 are fabricated from an electrically non-conductive material such as nylon or other insulative plastic.

An insert member 50 extends across one end of bore 24 and carries three electrical contacts or pin terminals 52, 54 and 56. Inset member 50 is fabricated of a non-conductive material and can be affixed in bore 24 by any suitable means such as securing it between shoulder 28 of bore 24 and body lip 58. Terminals 52 and 56 are interconnected with conductor bars 36 and 38 by means of conductors 60 and 64 which are of a length which will permit reciprocal movement of plunger 30 in bore 24. A spring 66 disposed between insert 50 and chamber cap 44 biases plunger 30 forwardly so that a portion of the plunger stem 32 projects outwardly from body member 12 and into firm engagement with a switch actuating device. In addition to insuring good contact as between the switch and switch actuator, the spring provides a self adjusting feature in that it enables the plunger to move rearwardly or into the body member 12 in response to tolerance build-up or other variations which would otherwise impair proper switch operation.

Plunger 30 is provided with a bore or passageway 68 which extends longitudinally through the stem portion 32 and communicates with chamber 34. An electrically conductive rod member 70 is slidably disposed in passageway 68 and has a tapered nose portion 72 which projects outwardly from the plunger. A rearward portion of the rod extends into plunger chamber 34 and carries a dished shaped retainer 74 and a contact plate 76 which is disposed in engageable relationship with fixed contacts 40 and 42. A bushing 78 insulates contact plate 76 from rod 70. A second similar dished shaped retainer member 80 is affixed to transverse chamber wall 44 by means of stud 82 and cooperates with retainer member 74 to confine a spring 84 which urges rod member 70 forwardly so as to close cooperating contacts 40, 42 and 76, and project the rod nose portion 72 from the plunger. Thus, rod 70 is electrically interconnected with pin terminal 54 by means of the dished contact members 74 and 80, spring 84, stud 82 and conductor 62. In the preferred embodiment of the present invention, the vehicle backup lights are interconnected with pin terminals 52 and 56 and terminal 54 is interconnected with the engine starting circuit.

The control apparatus of this invention is illustrated in FIGURE 2 wherein the above described switch 10 is secured in a transmission casing 16 and engaged by a switch actuator. The switch actuator comprises a lever plate 86 which is located within the vehicle transmission and which is mounted on a rotatable shaft 88 for rotation therewith. Shaft 88 is operatively connected for rotative movement to a transmission selector control (not shown) and lever plate 86 is provided with a plurality of serrations or notches 90 which are engaged by a spring detent mechanism 92 to retain the lever plate 86 in predetermined positions corresponding to different transmission selector settings. Preferably, the lever plate 86 is provided with a laterally extending finger 94 which is operatively connected to a movable element of a drive ratio selector valve 96. The drive ratio selector valve 96 is adapted to control the hydraulic control system of a transmission in the manner described in U.S. Patent 2,932,977 and reference may be made thereto for a description of a hydraulic control system and the operative components of a transmission suitable for use with the control arrangement of this invention.

Figure 4:
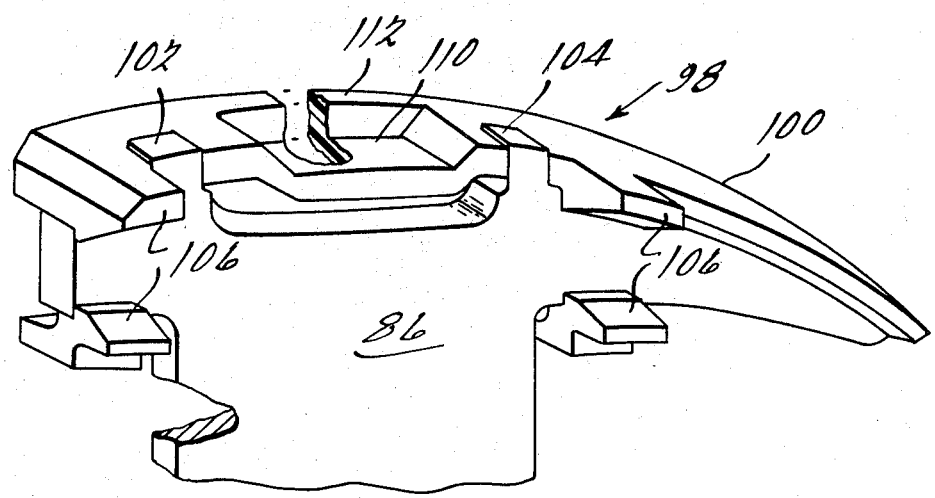
FIGURE 4 is an enlarged perspective view of the cam actuating portion of the control arrangement of this invention.

Lever plate 86 is provided with a unique cam surface indicated generally by reference numeral 98 which is provided with both electrically conductive and non-conductive areas. As seen with particular clarity in FIGURE 4, cam surface 98 is comprised of an insulator member 100 and portions of lever plate 86 which is fabricated from metal or other electrically conductive material. Lever plate 86 is provided with a pair of circumferentially spaced ears or raised metal potions 102 and 104 which project through grooves in the insulator member so as to be flush with, or slightly raised above, the outer peripheral surface of the insulator member 100. The insulator member is formed from plastic or other non-conductive material, such as nylon, and is securely attached to lever plate 86 by any suitable means. For example, it can be affixed to the lever plate by way of fingers 106 projecting outwardly from the insulator member and which are of a configuration adapted to snap over or otherwise engage the lever plate, or, alternatively, by means of rivets or screws 108 as shown in FIGURES 2 and 3. A recess or notch 110 is provided in the insulator portion of the cam surface so as to lie between the two electrically conductive projections 102, 104. The width of the offset portion 110 is less than the width of the insulator member 100 thereby providing a bridging side portion 112. Accordingly, a continuous circumferentially non-offset primary cam surface pathway is thereby provided.

As seen in FIGURE 2, the switch potion 10 of the control apparatus of this invention is screw threaded into the transmission casing until the switch plunger 30 and rod 70 contact cam surface 98 of lever plate 86. The plunger stem porton 32 and rod nose portion 72 are maintained in firm contact with the cam surface by means of springs 66 and 84, respectively. Moreover, it will be recognized that the plunger and rod members will automatically "float" or move longitudinally so as to remain in contact with the cam surface should dimensional variations or tolerance buildups alter the distance between the switch and switch actuator.

The relative positions of the cam surface 98 and cam engaged switch members 32 and 72 as seen in FIGURE 2 results from the transmission selector being placed in "drive position." In this position, plunger 30 and rod 70 are both engaged by the non offset portion of the insulator 100 and, accordingly, rod 70 is disposed, against the bias of spring 84, rearwardly from its position as shown in FIGURE 1 thereby disengaging contact plate 76 from contacts 40 and 42 and opening the backup light circuits. Likewise, the engine starting circuit is open since rod 70 is engaged with the insulator portion of cam surface 98. Accordingly it is seen that the backup light and engine starting circuits are inoperative when the transmission selector is to the drive position. It is obvious from FIGURE 2 that this same circuit condition also prevails in the other forward drive positions of second and low.

Moving the transmission selector to either of the "neutral" or "park" positions, causes lever plate 86 to rotate so as to move one of the electrically conductive members 102, 104 into contact with rod member 70. This condition is illustrated in FIGURE 3 which shows conductor portion 102 in engagement with rod 70 as a result of the transmission selector being moved to the "park position." Accordingly, it can be seen that in either of the "park" or "neutral" positions, rod 70 is in contact with one of the electrically conductive members 102, 104 thereby making a circuit to ground through the lever plate 86 and completing the starter motor circuit thereby enabling cranking of the engine. At the same time, however, rod 70 is disposed rearwardly against the bias of spring 84 and contact plate 76 remains disengaged from contacts 40 and 42 thereby rendering the backup light circuits inoperative.

When the transmission selector is moved to the "reverse position" lever plate 86 is rotated such that the offset cam portion 110 is opposite rod 70 and plunger 30. Accordingly, rod 70 in response to spring 84 moves into the offset portion 110 as seen in FIGURE 1. However, plunger 30 continues to ride on cam portion 112 and, therefore, the movement of rod 70 relative to plunger 30 carries contact plate 76 into engagement with contacts 40 and 42 thereby completing the backup light circuits. Obviously, with rod 70 disposed in offset position 110, the starter motor circuit remains open.

It will be noted that the function of groove 110 is to provide a cam surface configuration which will permit relative movement as between plunger 30 and rod 70 so as to complete the backup light circuit. Thus, lever plate 86 is in essence provided with a primary cam surface which in turn has a secondary cam surface for effectuating relative movement as between certain of the switch components. It will be obvious, however, that such relative movement can also be accomplished by providing a protuberance on the cam surface which would move plunger 30 inwardly thereby carrying contacts 40 and 42 into engagement with contact plate 76 so as to complete the backup light circuit. Likewise, an aperture or elongated opening could also be used in place of a groove. Accordingly, the term "offset position" as used herein is intended to refer not only to a notch or groove such as illustrated in the accompanying drawings but also to a projection or protuberance which would provide a suitable secondary cam surface.

In summary, it is seen that a compact and easily installed control assembly has been provided which is composed of a minimum of parts and which is unlikely ever to fail in operation.

While but one embodiment of this invention has been described and illustrated, it is to be understood that such is for the purpose of illustration only, and it is contemplated that those skilled in the art may modify certain details without departing from the spirit or scope of the invention as defined in the claims appended hereto.

I claim:

1. In a vehicle provided with a transmission having selector means movable to a plurality of positions to establish different transmission operating ranges including reverse, neutral, drive and park, control apparatus for a plurality of circuits including a vehicle engine cranking circuit and a backup light circuit, said control apparatus comprising a lever plate movable in response to movement of the selector means and provided with a cam surface composed of electrically conductive and non-conductive areas, and a switch having contacts whereby at least one of said plurality of circuits can be opened and closed, said switch having a first cam engageable floating portion, at least one contact carried by said first floating portion, means for biasing said floating portion into slidable engagement with said cam surface, and a second floating cam engageable portion having at least one contact engageable with said contact of said first floating portion so as to provide a pair of cooperating contacts, said cam surface of said lever plate having a configuration adapted to move one of said first and second cam engageable portions of said switch relative to the other when the cam is moved to a predetermined position.

2. Control apparatus as set forth in claim 1 wherein said switch comprises a body portion having a bore extending longitudinally therein, said first cam engageable floating portion of said switch comprising a plunger reciprocably supported in said bore and disposed by first biasing means so as to have a cam engageable end portion which projects outwardly from said bore, said plunger having a chamber portion adjacent one end thereof and a passageway communicating with said chamber and cam engageable end, and said second floating cam engageable portion of said switch comprising a rod member reciprocally disposed in said plunger passageway so as to extend outwardly from each end of said passageway, said rod being acted upon by second biasing means urging said rod outwardly from said plunger cam engageable end portion.

3. Control apparatus as set forth in claim 1 wherein said relative movement of said first and second cam engageable members is effected by an offset portion located on the cam surface.

4. Control apparatus as set forth in claim 3 wherein said cam surface is provided with at least two circumferentially spaced electrically conductive areas, and wherein said offset portion of said cam surface is between said electrically conductive areas.

5. Control apparatus as set forth in claim 1 wherein said cam surface is provided with two circumferentially spaced electrically conductive areas which are interposed in said vehicle engine cranking circuit, wherein said switch comprises a body portion having a bore extending longitudinally therein, said first cam engageable floating portion of said switch comprising a plunger member reciprocally supported in said bore and disposed by first biasing means so as to have a cam engageable end portion which projects outwardly from said bore, said plunger having a chamber portion adjacent one end thereof and a passageway communicating with said chamber and cam engageable end portion, said second floating cam engageable portion of said switch comprising a rod member reciprocally disposed in said plunger passageway so as to extend outwardly from each end of said passageway, said rod being urged outwardly from said plunger cam engageable end portion by second biasing means, and wherein said cam surface is provided with an offset portion between said electrically conductive areas capable of effectuating relative axial movement of one of said first and second cam engageable portions of said switch.

6. Control apparatus as set forth in claim 5 wherein said lever plate is pivotally mounted in the interior of the vehicle transmission and is provided with an arm member operably connected to a drive ratio selector valve adapted to control the hydraulic control system of said transmission.

7. Control apparatus as set forth in claim 5 wherein movement of said transmission selector means to either of said neutral and park positions will cause said lever plate to move to a position wherein said rod member is engaged by one of the electrically conductive areas of said cam surface thereby completing the vehicle engine cranking circuit, and wherein movement of said transmission selector means to said reverse position will result in said lever plate moving to a position wherein said cam surface offset portion moves one of said rod and plunger members axially with respect to the other of said members, said axial movement of said member causing said cooperating contacts to engage thereby completing said vehicle backup light circuit.

8. A transmission control and backup light switch comprising an elongated body portion having a longitudinal bore, first electrical contact means disposed adjacent one end of said bore, a plunger reciprocally supported in said bore and disposed by first biasing means so as to have a free end portion which projects outwardly from the end of said bore opposite said first contact means, said plunger having a chamber portion adjacent one end thereof and a passageway communicating with said chamber portion and the opposite end of said plunger, second electrical contact means provided within said chamber portion, conductor means interconnecting said first and second electrical contact means, a rod member reciprocally disposed in said plunger passageway so as to extend outwardly from each end of said passageway, third electrical contact means carried by said rod member and engageable with said second electrical contact means so as to provide at least one pair of cooperating contacts, and second biasing means urging said rod member outwardly from the free end portion of said plunger.

9. A transmission control and backup light switch according to claim 8 wherein said first electrical contact means are secured to an insert member, said insert member extending across one end of said bore; wherein said chamber is located in the end of said plunger opposite the plunger free end portion and is provided with a transverse wall extending across said bore and generally parallel to said insert member; and wherein said second electrical contact means and conductor means are interconnecting at said plunger transverse wall.

10. A transmission control and backup light switch according to claim 9 wherein said longitudinal bore has a portion of enlarged diameter thereby providing a shoulder which serves as a plunger stop member.

References Cited

UNITED STATES PATENTS

| 2,829,213 | 4/1958 | Brett | 200—61.88 |
| 3,249,727 | 5/1966 | Furman | 200—159 |
| 3,242,280 | 3/1966 | Krieger | 200—61.88 XR |
| 3,272,948 | 9/1966 | Gloviak et al. | 200—159 XR |
| 2,427,453 | 9/1947 | Hadley | 340—70 XR |

ROBERT K. SCHAEFER, *Primary Examiner.*

M. GINSBURG, *Assistant Examiner.*

U.S. Cl. X.R.

200—159; 340—70